United States Patent
Martin et al.

(10) Patent No.: US 9,238,199 B1
(45) Date of Patent: Jan. 19, 2016

(54) COMBINED FLOW MIXING, TEMPERING AND NOISE SUPPRESSING APPARATUS FOR A SELECTIVE CATALYTIC REDUCTION SYSTEM AND METHOD OF USE THEREOF

(71) Applicant: Honeywell International, Inc., Morristown, NJ (US)

(72) Inventors: Matthew Martin, Tulsa, OK (US); Kurt Kraus, Tulsa, OK (US); Christopher Ferguson, Tulsa, OK (US); Brian Duck, Tulsa, OK (US); Richard Martin, Tulsa, OK (US)

(73) Assignee: HONEYWELL INTERNATIONAL, INC., Morris Plains, NJ (US)

( * ) Notice: Subject to any disclaimer, the term of this patent is extended or adjusted under 35 U.S.C. 154(b) by 406 days.

(21) Appl. No.: 13/833,951

(22) Filed: Mar. 15, 2013

(51) Int. Cl.
*B01D 50/00* (2006.01)
*B01D 53/94* (2006.01)

(52) U.S. Cl.
CPC ................... *B01D 53/9418* (2013.01)

(58) Field of Classification Search
CPC .... B01D 53/56; B01D 53/504; B01D 53/501; F01N 3/2066; F01N 2/2892; F01N 3/2846; F01N 2330/08

USPC .......... 422/168, 170, 172, 176; 181/240, 228, 181/204

See application file for complete search history.

(56) References Cited

U.S. PATENT DOCUMENTS

| | | | |
|---|---|---|---|
| 4,149,375 A | 4/1979 | Wynosky et al. | |
| 4,401,269 A | 8/1983 | Eiler | |
| 5,307,628 A * | 5/1994 | Castagne | 60/284 |
| 5,426,269 A * | 6/1995 | Wagner et al. | 181/232 |
| 2005/0193716 A1 | 9/2005 | Schlinker et al. | |
| 2011/0162339 A1* | 7/2011 | Alexander et al. | 60/39.5 |

* cited by examiner

*Primary Examiner* — Tom P Duong

(57) ABSTRACT

A combined flow mixing, tempering and noise suppressing apparatus for a selective catalytic reduction system, and method of use thereof is provided. The suppressing apparatus is positioned downstream of a gas input duct of the selective catalytic reduction system in order to provide improved flow uniformity and reduced noise at the entrance to the SCR system with minimal pressure loss. The combined flow mixing, tempering and noise suppressing apparatus includes lobe depressions that extend toward a centerline axis of a gas input duct of the selective catalytic reduction system and alternating lobe protrusions leading away from the centerline axis. The combined flow mixing, tempering and noise suppressing apparatus can include a means for introducing a secondary stream, such as an air manifold or an air bustle in fluid communication with the selective catalytic reduction system.

43 Claims, 15 Drawing Sheets

COMBINED FLOW MIXING, TEMPERING AND NOISE SUPPRESSING APPARATUS FOR A SELECTIVE CATALYTIC REDUCTION SYSTEM AND METHOD OF USE THEREOF

1. Field of the Invention

This invention relates generally to a combined flow mixing, tempering and noise suppressing apparatus for a selective catalytic reduction (SCR) system and method of use thereof, and more particularly to a lobe mixer positioned downstream of a gas input duct of the SCR system in order to provide improved flow uniformity and reduced noise at the entrance to the SCR system with minimal pressure loss.

2. Description of the Related Art

Flue gas waste streams produced from combustion, such as that produced by burning gas, coal, oil, or other carbon-based fuel sources in combustion turbine engines or for other similar uses, typically contain toxic elements, including carbon monoxide (CO) and nitrogen oxide ($NO_x$). $NO_x$ refers to the cumulative emissions of nitric oxide (NO), nitrogen dioxide ($NO_2$) and trace quantities of other chemicals during combustion which are environmentally hazardous substances. Combustion of fossil fuels generates some level of $NO_x$ due to high temperatures and availability of oxygen and nitrogen from both the fuel and air. Releasing such combustion waste streams without removing these toxic elements is bad for the environment. Additionally, many places have regulations or laws prohibiting such release. The extent to which CO and $NO_x$ may be released into the environment varies widely under these various laws. California, in particular, has a very high standard regarding such emissions. Therefore, producers of such combustion waste streams frequently must process such waste streams to reduce the amount of toxic elements before releasing the waste streams into the environment. $NO_x$ emissions may be controlled using low $NO_x$ combustion technology and post-combustion techniques, such as selective catalytic reduction. SCR systems catalytically reduce flue gas $NO_x$ to nitrogen and water using ammonia ($NH_3$) in a chemical reaction.

SCR systems treat the $NO_x$ before the gas is released into the atmosphere. SCR systems rely on a catalyst to treat flue gas as the gas passes through the SCR system. Because the catalyst is an integral part of the SCR chemical reaction, SCR systems attempt to provide maximum exposure of the catalyst to the flue gas in order to ensure that all the flue gas comes sufficiently into contact with the catalyst for treatment. The catalysts used in SCR systems are carefully engineered and expensive. Thus, it is beneficial to be able to control the stoichiometry of the exhaust gas/ammonia/catalyst reaction.

Ammonia injection grids with zone controls have been installed to distribute a prescribed amount of ammonia for $NO_x$ reducing SCR systems. To increase the mixing efficiency and reduce the required mixing distance, many SCR installations are equipped with static mixers. Static mixers typically utilize elaborate designs, are difficult to fabricate, have higher construction and installation costs, and cause significantly higher pressure drop. Static mixers are typically installed between the ammonia injection grid and the SCR catalyst bed; however, deflectors or baffles attached to the injection nozzles or turbulence enhancers installed between the injection tubes have also been utilized.

In the SCR exhaust stack, there is generally a need for noise suppression. Typically, a muffler, also called a silencer, is included in the SCR exhaust stack for noise suppression downstream of the ammonia injection grid and the catalyst bed to provide the required noise suppression. The muffler adds length to the SCR exhaust stack, increases exhaust stack system costs and increases the pressure drop in the stack.

It is therefore desirable to provide a combined flow mixing, tempering and noise suppressing apparatus for an SCR system.

It is also desirable to provide a method of using the apparatus for improved uniformity and noise reduction of a gas waste stream entering the SCR system with minimal pressure loss.

It is further desirable to provide a lobe mixer positioned downstream of a gas input duct of the SCR system in order to provide improved flow uniformity and reduce noise at the entrance to the SCR system.

It is still further desirable to provide a combined flow mixing, tempering and noise suppressing apparatus positioned downstream of a gas input duct and upstream of a catalyst bed in a SCR system to provide improved exhaust flow uniformity, noise suppression and to eliminate the need for a muffler in the exhaust stack in order to provide superior operational efficiency.

It is yet further desirable to provide a combined flow mixing, tempering and noise suppressing apparatus that can include a secondary stream, such as a tempering air, steam or an ammonia-steam mixture, introduced in the lobe depressions of the apparatus.

SUMMARY OF THE INVENTION

In general, in a first aspect, the invention relates to an SCR system having a waste stream gas input duct, an exhaust stack located downstream from the gas input duct and a combined flow mixing, tempering and noise suppressing apparatus positioned downstream from the waste stream gas input duct and upstream from the exhaust stack.

The ammonia injection grid assembly and an SCR catalyst assembly of the SCR system can include one or more of ammonia injection grid assemblies and one or more SCR catalyst assemblies, ordered such that each ammonia injection grid assembly is immediately followed by an SCR catalyst assembly. The SCR system can also include a distribution grid located intermediate of the gas input duct and the ammonia injection grid assembly and the SCR catalyst assembly. In addition, at least one air intake duct may be located intermediate of the gas input duct and the ammonia injection grid assembly and the SCR catalyst assembly and/or may be located upstream from the distribution grid, if present. Additionally, the SCR system can include at least one catalyst bed located downstream from the gas input duct or a plurality of catalyst beds, ordered such that each catalyst bed is immediately followed by an ammonia injection grid assembly.

The combined flow conditioner and noise suppression device of the SCR system can be constructed from a casting of metal, a formed or pressed sheet metal or welded sections of plate and/or can be coated with a refractory material. The combined flow mixing, tempering and noise suppressing apparatus can also include at least one lobe depression that extends toward a centerline axis of the gas input duct and at least one alternating lobe protrusion leading away from the centerline axis. Further, the combined flow mixing, tempering and noise suppressing apparatus can be a lobe mixer having six lobe depressions and six lobe protrusions in a sinusoidal profile.

The combined flow mixing, tempering and noise suppressing apparatus can be positioned internally within the SCR system or positioned externally at an entrance to the SCR system. The combined flow mixing, tempering and noise suppressing apparatus can also include a toroidal air manifold having a plurality of air manifold pipes. The manifold pipes are in fluid communication with the SCR system, such as via circumferentially spaced ports of a circular plate. The manifold pipes can be positioned substantially parallel with respect to the flow of the waste stream, or can be positioned at an angle with respect to the flow of the waste stream. Alternatively, the combined flow mixing, tempering and noise suppressing apparatus can include a hollow annular air bustle forming a chamber to which a secondary stream under pressure is supplied. The chamber of the air bustle is in fluid communication with the SCR system, such as via circumferentially spaced ports of a circular plate.

In general, in a second aspect, the invention relates to a SCR system having a gas input duct, a catalyst bed located downstream from the gas input duct, an ammonia injection grid assembly and an SCR catalyst assembly located downstream from the catalyst bed, and an exhaust stack located downstream from the catalyst bed, the ammonia injection grid assembly and the SCR catalyst assembly. The SCR system includes a combined flow mixing, tempering and noise suppressing apparatus located downstream from the gas input duct and upstream from the catalyst bed.

The combined flow conditioner and noise suppression device of the SCR system can be constructed from a casting of metal, a formed or pressed sheet metal or welded sections of plate and/or can be coated with a refractory material. The combined flow mixing, tempering and noise suppressing apparatus can also have at least one lobe depression that extends toward a centerline axis of the gas input duct and at least one alternating lobe protrusion leading away from the centerline axis. Further, the combined flow mixing, tempering and noise suppressing apparatus can be a lobe mixer having six lobe depressions and six lobe protrusions in a sinusoidal profile.

The combined flow mixing, tempering and noise suppressing apparatus can be positioned internally within the SCR system or positioned externally at an entrance to the SCR system. The combined flow mixing, tempering and noise suppressing apparatus can also include a toroidal air manifold having a plurality of air manifold pipes. The manifold pipes are in fluid communication with the SCR system, such as via circumferentially spaced ports of a circular plate. The manifold pipes can be positioned substantially parallel with respect to the flow of the waste stream, or can be positioned at an angle with respect to the flow of the waste stream. Alternatively, the combined flow mixing, tempering and noise suppressing apparatus can include a hollow annular air bustle forming a chamber to which a secondary stream under pressure is supplied. The chamber of the air bustle is in fluid communication with the SCR system, such as via circumferentially spaced ports of a circular plate.

In general, in a third aspect, the invention relates to a combined flow mixing, tempering and noise suppressing apparatus for a SCR system. The SCR system has a gas input duct, a catalyst bed located downstream from the gas input duct, an ammonia injection grid assembly and an SCR catalyst assembly located downstream from the catalyst bed, and an exhaust stack located downstream from the ammonia injection grid assembly and the SCR catalyst assembly. The combined flow mixing, tempering and noise suppressing apparatus includes a lobe mixer positioned downstream from the gas input duct and upstream from the catalyst bed in the SCR system. The lobe mixer has lobe depressions that extend toward a centerline axis of the gas input duct and alternating lobe protrusions leading away from the centerline axis.

The combined flow conditioner and noise suppression device of the SCR system can be constructed from a casting of metal, a formed or pressed sheet metal or welded sections of plate and/or can be coated with a refractory material. Further, the combined flow mixing, tempering and noise suppressing apparatus can be a lobe mixer having six lobe depressions and six lobe protrusions in a sinusoidal profile. The combined flow mixing, tempering and noise suppressing apparatus can also include a toroidal air manifold having a plurality of air manifold pipes. The manifold pipes are in fluid communication with the SCR system. The manifold pipes can be positioned substantially parallel with respect to the flow of the waste stream, or can be positioned at an angle with respect to the flow of the waste stream. Alternatively, the combined flow mixing, tempering and noise suppressing apparatus can include a hollow annular air bustle forming a chamber to which a secondary stream under pressure is supplied. The chamber of the air bustle is in fluid communication with the SCR system.

BRIEF DESCRIPTION OF THE DRAWINGS

FIG. 21 is a rear perspective view of the external lobe mixer having the angled air manifold shown in FIG. 17 through;

Other advantages and features will be apparent from the following description and from the claims.

DETAILED DESCRIPTION OF THE INVENTION

The apparatuses and methods discussed herein are merely illustrative of specific manners in which to make and use this invention and are not to be interpreted as limiting in scope.

While the apparatuses and methods have been described with a certain degree of particularity, it is to be noted that many modifications may be made in the details of the construction and the arrangement of the apparatuses and components without departing from the spirit and scope of this disclosure. It is understood that the apparatuses and methods are not limited to the embodiments set forth herein for purposes of exemplification.

Figure 1:
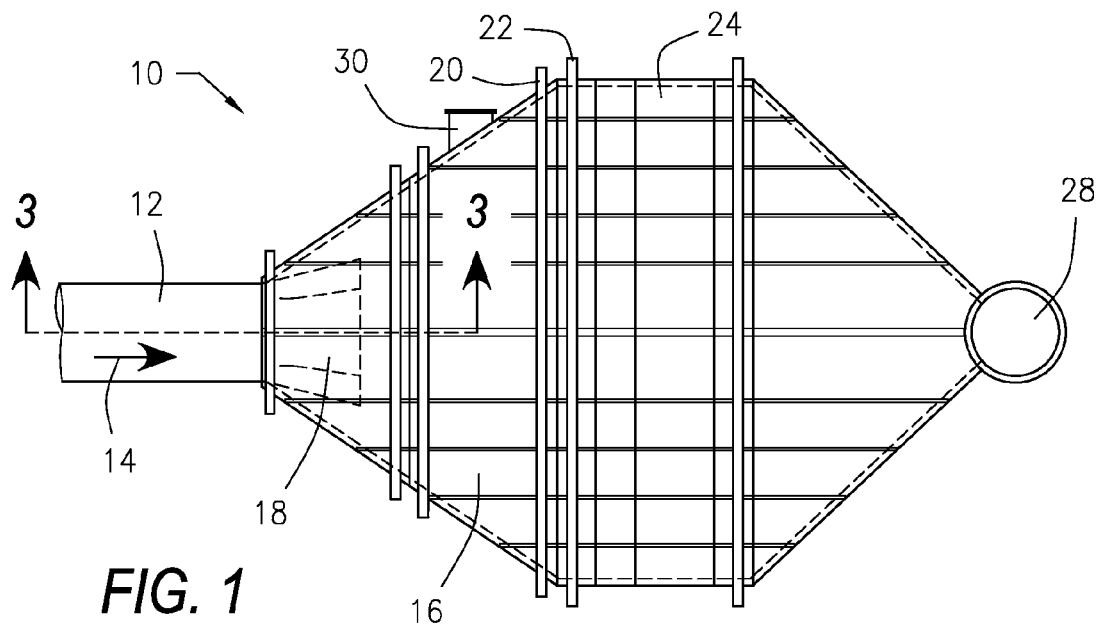
FIG. 1 is an elevation view of an SCR system having an example of an internal lobe mixer positioned downstream of a gas input duct, within the SCR system and upstream of a catalyst bed in accordance with an illustrative embodiment of the combined flow mixing, tempering and noise suppressing apparatus for the SCR system disclosed herein.
Figure 2:
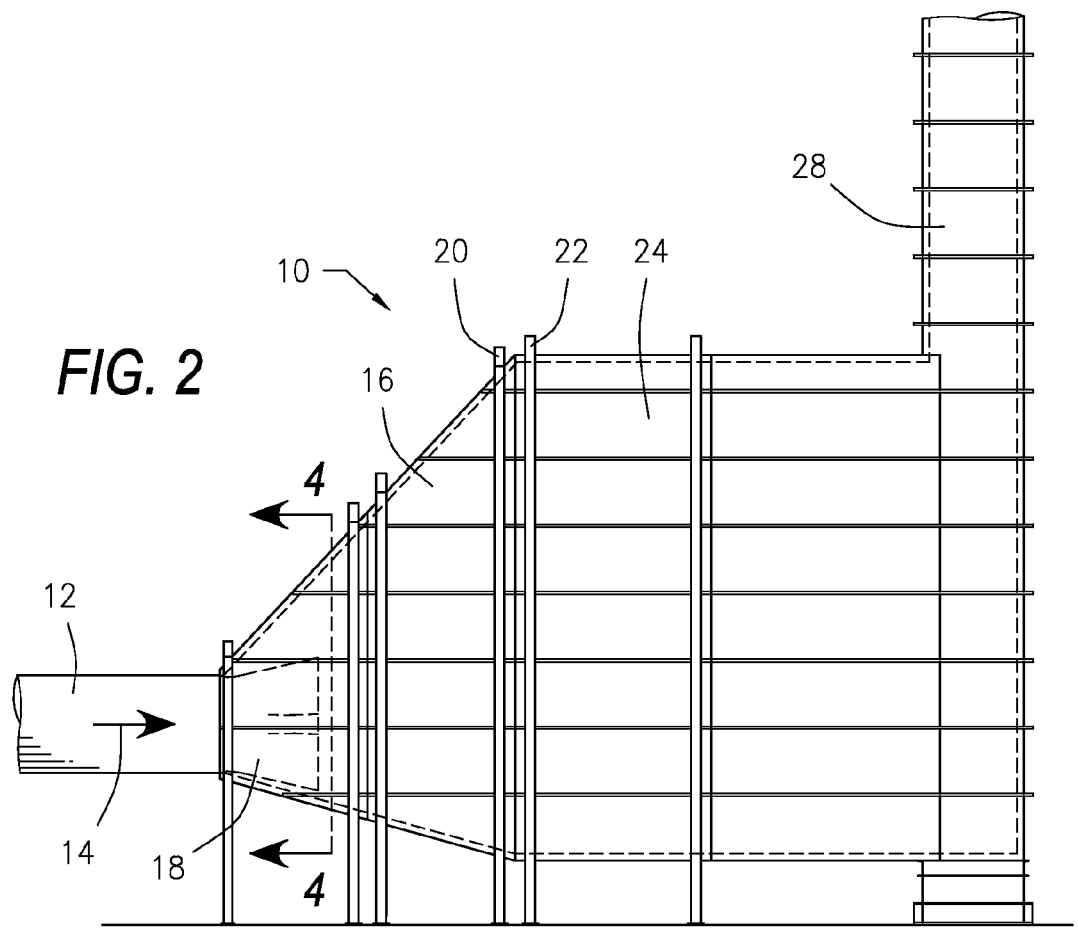
FIG. 2 is a plan view of the SCR system shown in FIG. 1.
Figure 3:
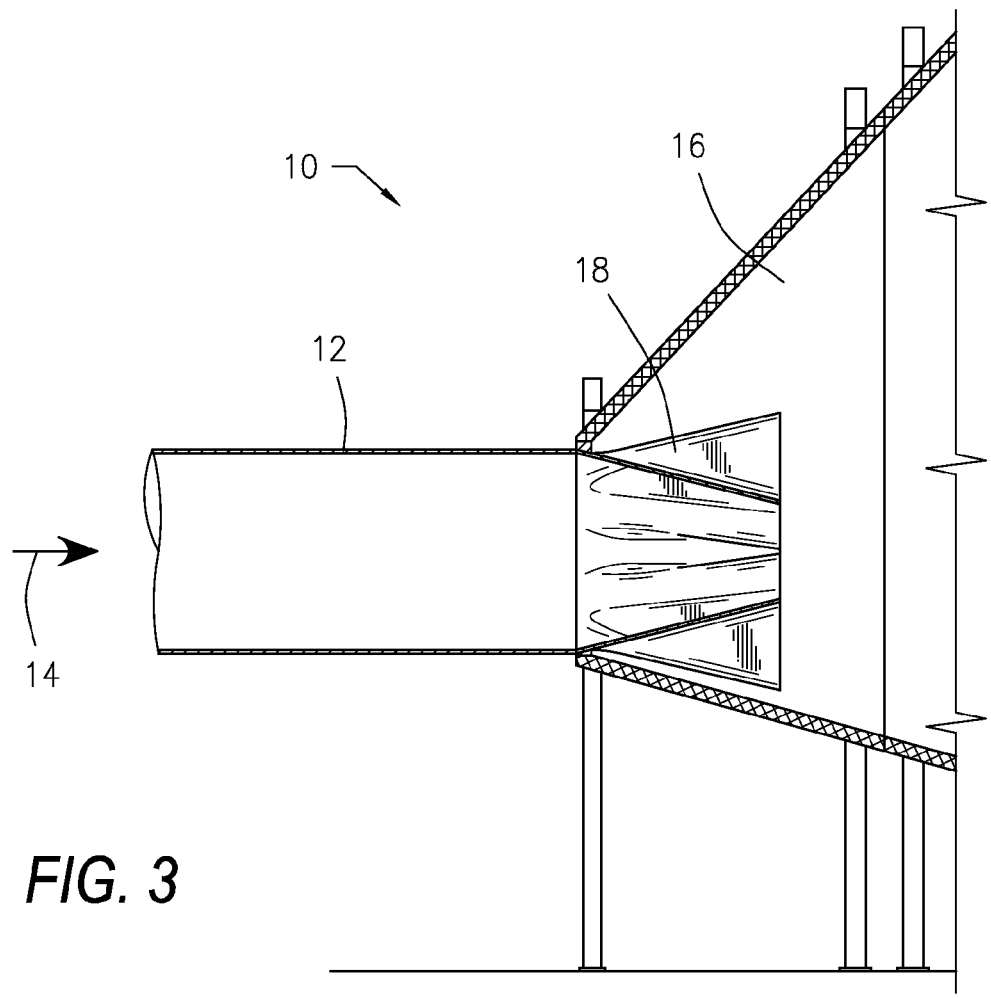
FIG. 3 is a cross-sectional view along line 3-3 of the SCR system shown in FIG. 1.
Figure 4:
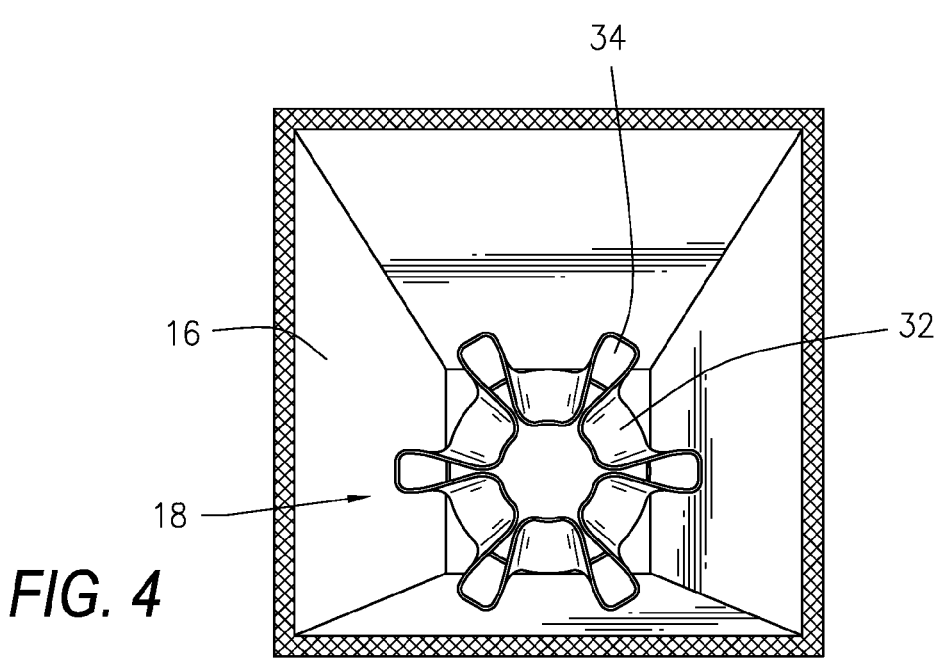
FIG. 4 is a cross-sectional view along line 4-4 of the SCR system shown in FIG. 2.
Figure 5:
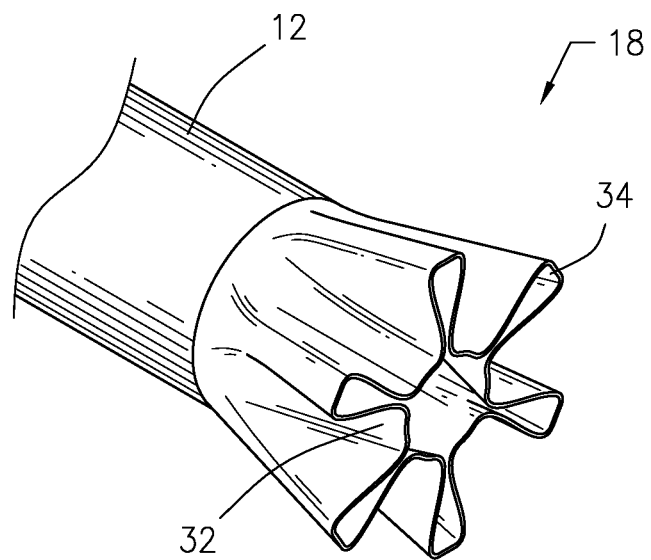
FIG. 5 is a perspective view of the internal lobe mixer shown in FIGS. 1 through 4.
Figure 6:
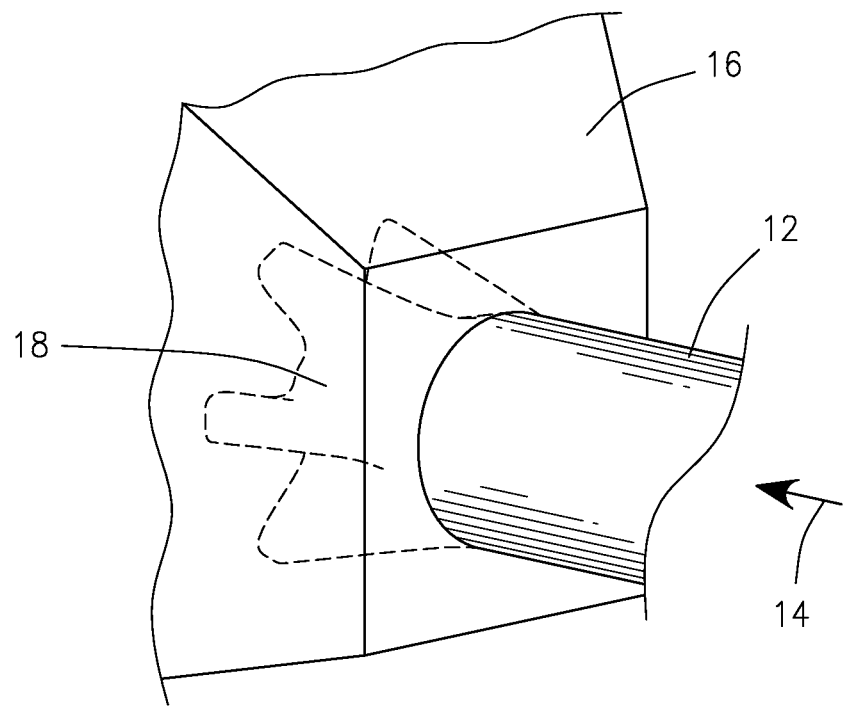
FIG. 6 is a partial cutaway view of the internal lobe mixer shown in FIGS. 1 through 5 positioned within the SCR system.
Figure 7:
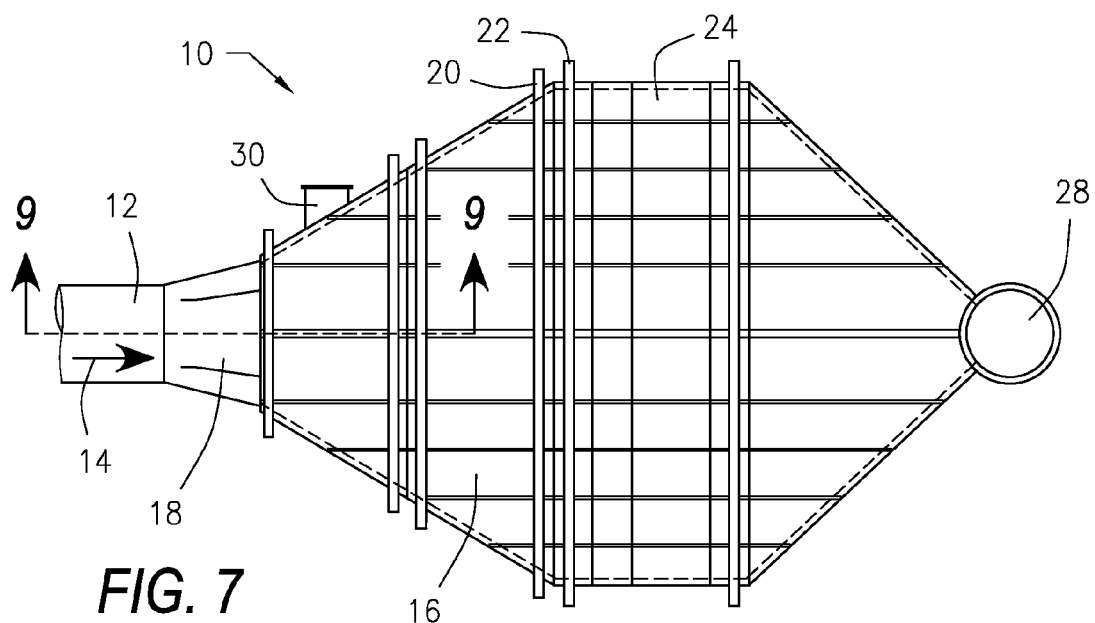
FIG. 7 is an elevation view of an SCR system having an example of an external lobe mixer positioned downstream of a gas input duct in accordance with an illustrative embodiment of the combined flow mixing, tempering and noise suppressing apparatus for the SCR system disclosed herein.
Figure 8:
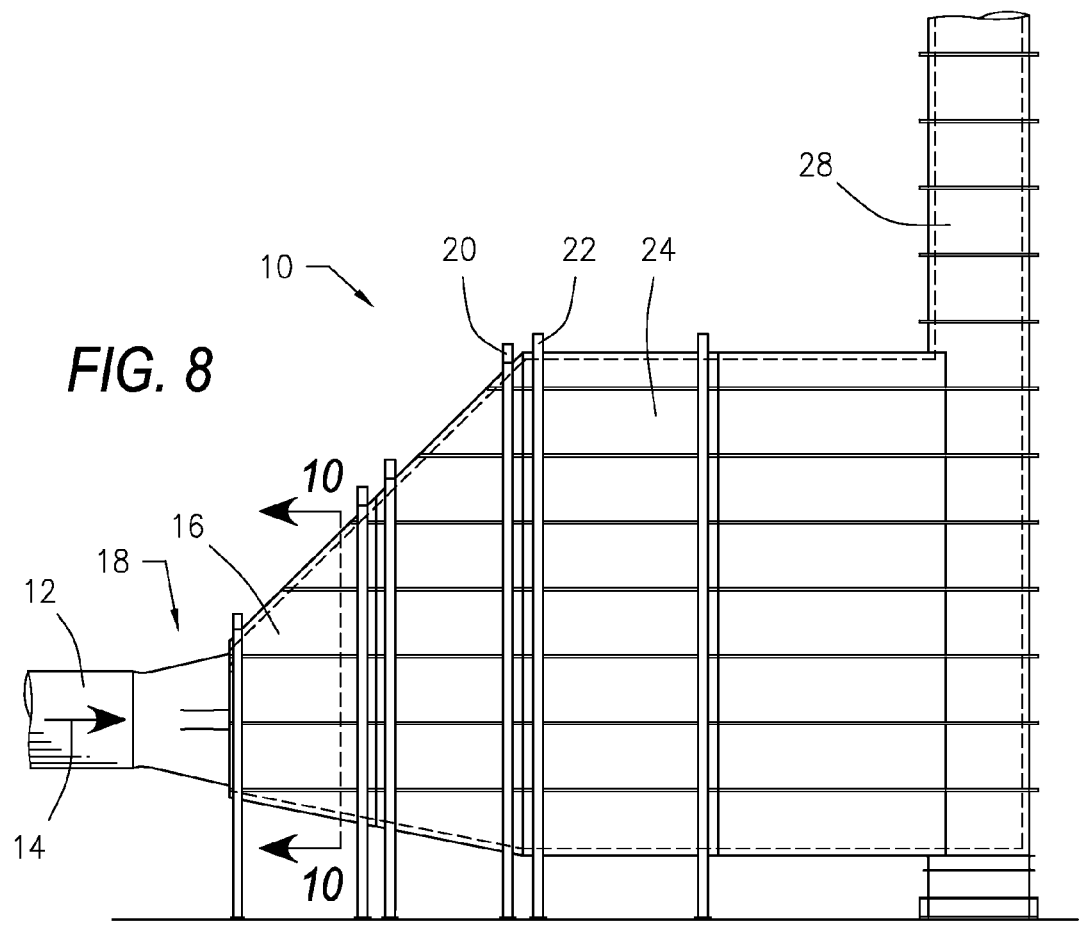
FIG. 8 is a plan view of the SCR system shown in FIG. 7.
Figure 9:
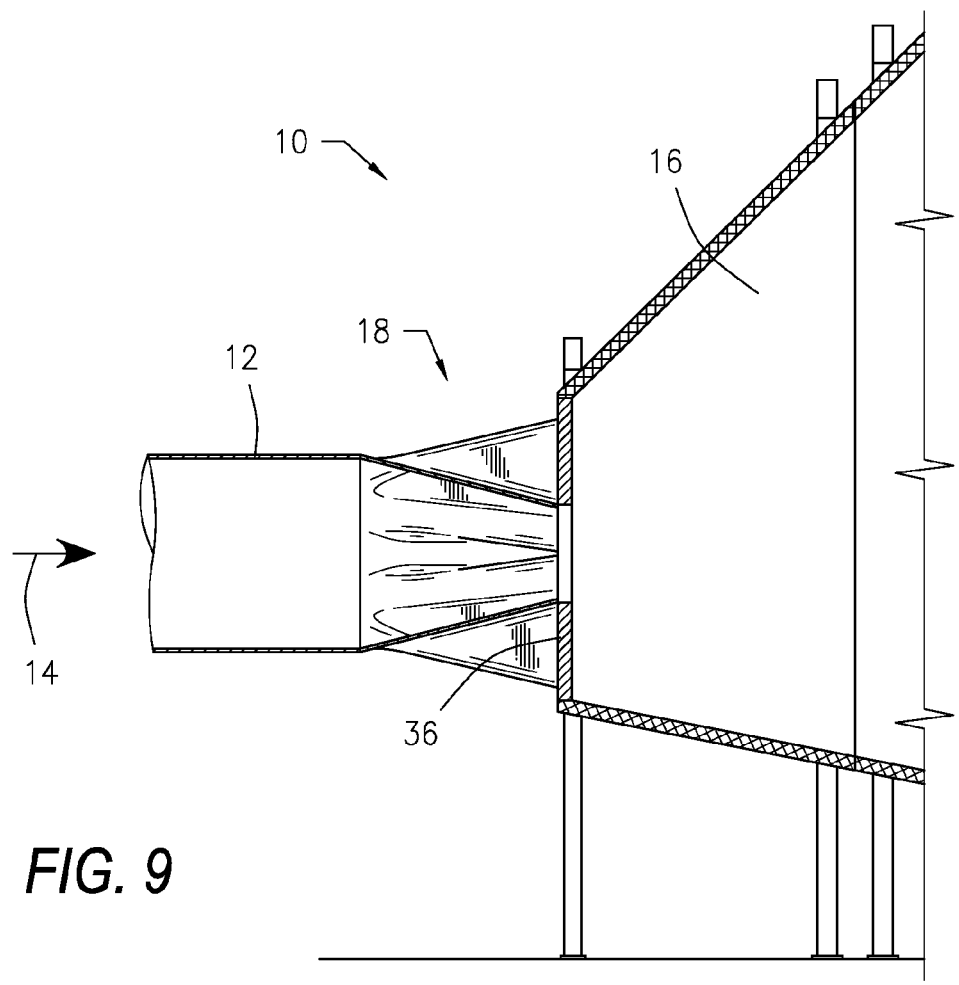
FIG. 9 is a cross-sectional view along line 9-9 of the SCR system shown in FIG. 7.
Figure 10:
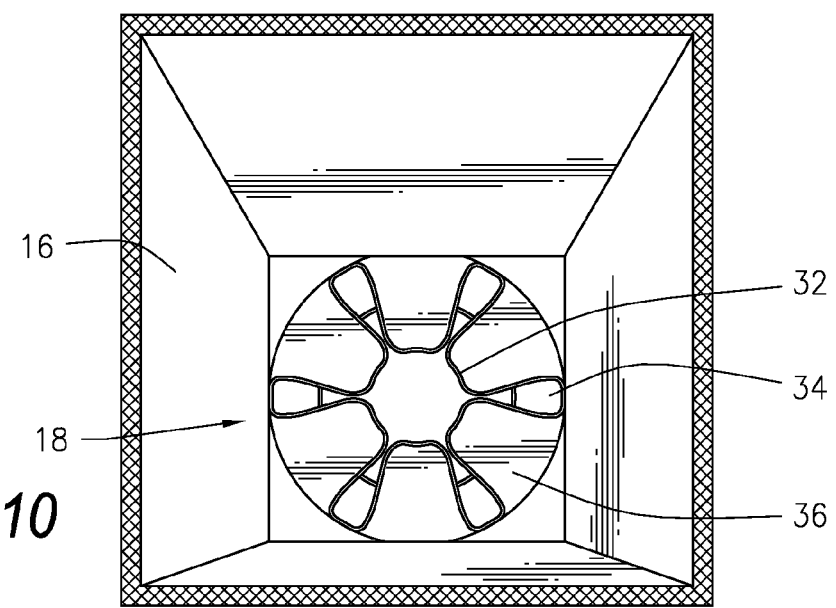
FIG. 10 is a cross-sectional view along line 10-10 of the SCR system shown in FIG. 8.
Figure 11:
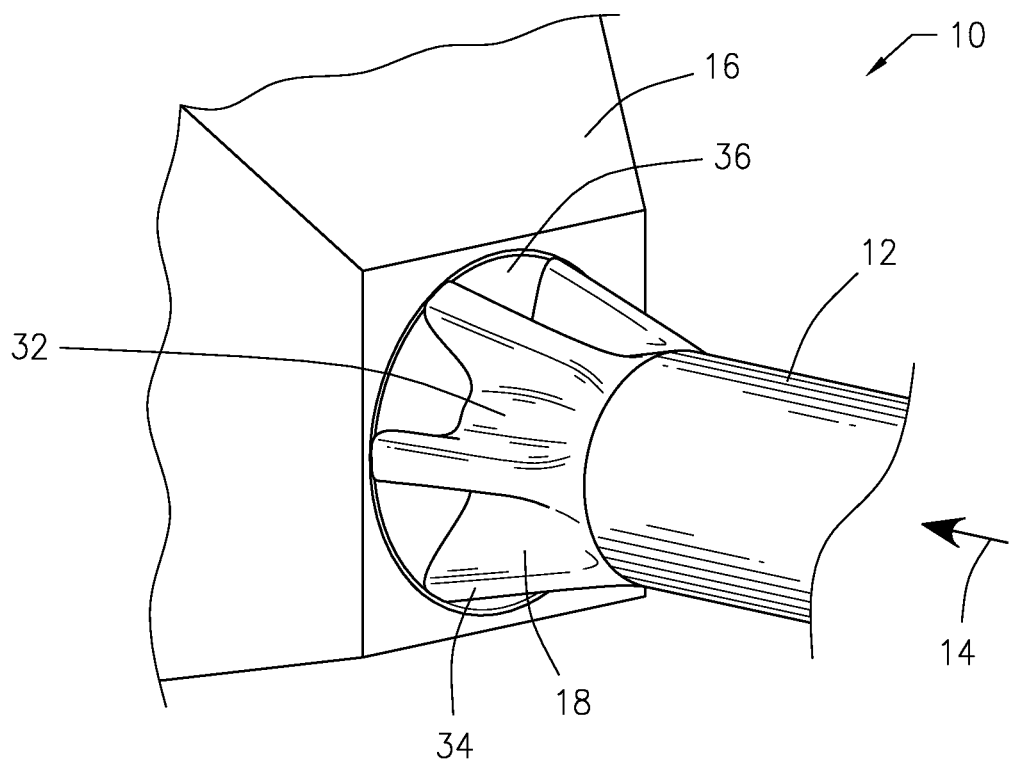
FIG. 11 is a rear perspective view of the external lobe mixer shown in FIGS. 7 through 10.
Figure 12:
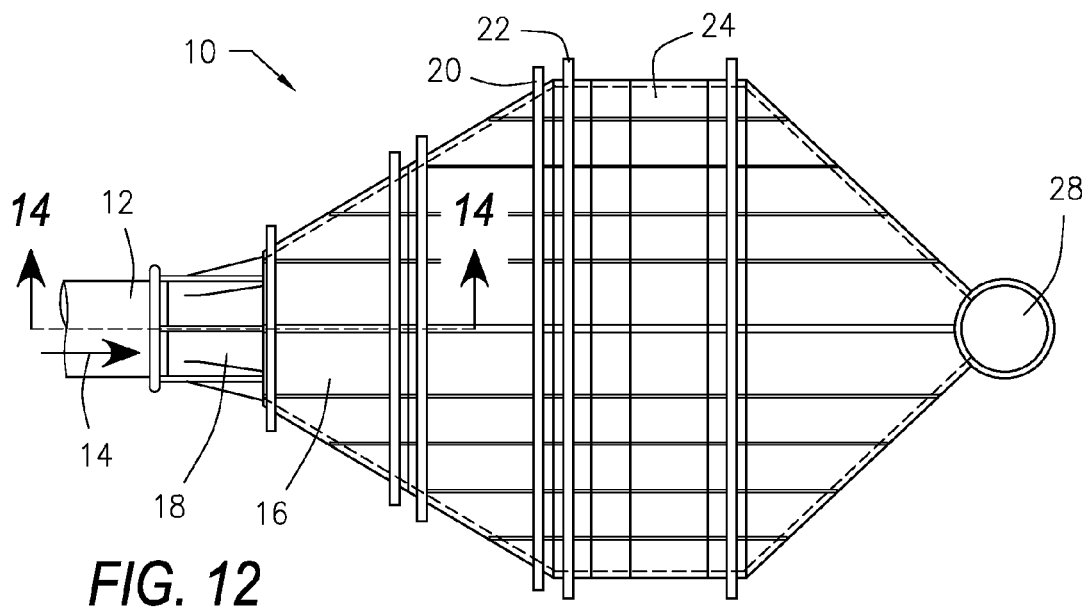
FIG. 12 is an elevation view of an SCR system having an example of an external lobe mixer having a straight air manifold and positioned downstream of a gas input duct in accordance with an illustrative embodiment of the combined flow mixing, tempering and noise suppressing apparatus for the SCR system disclosed herein.
Figure 13:
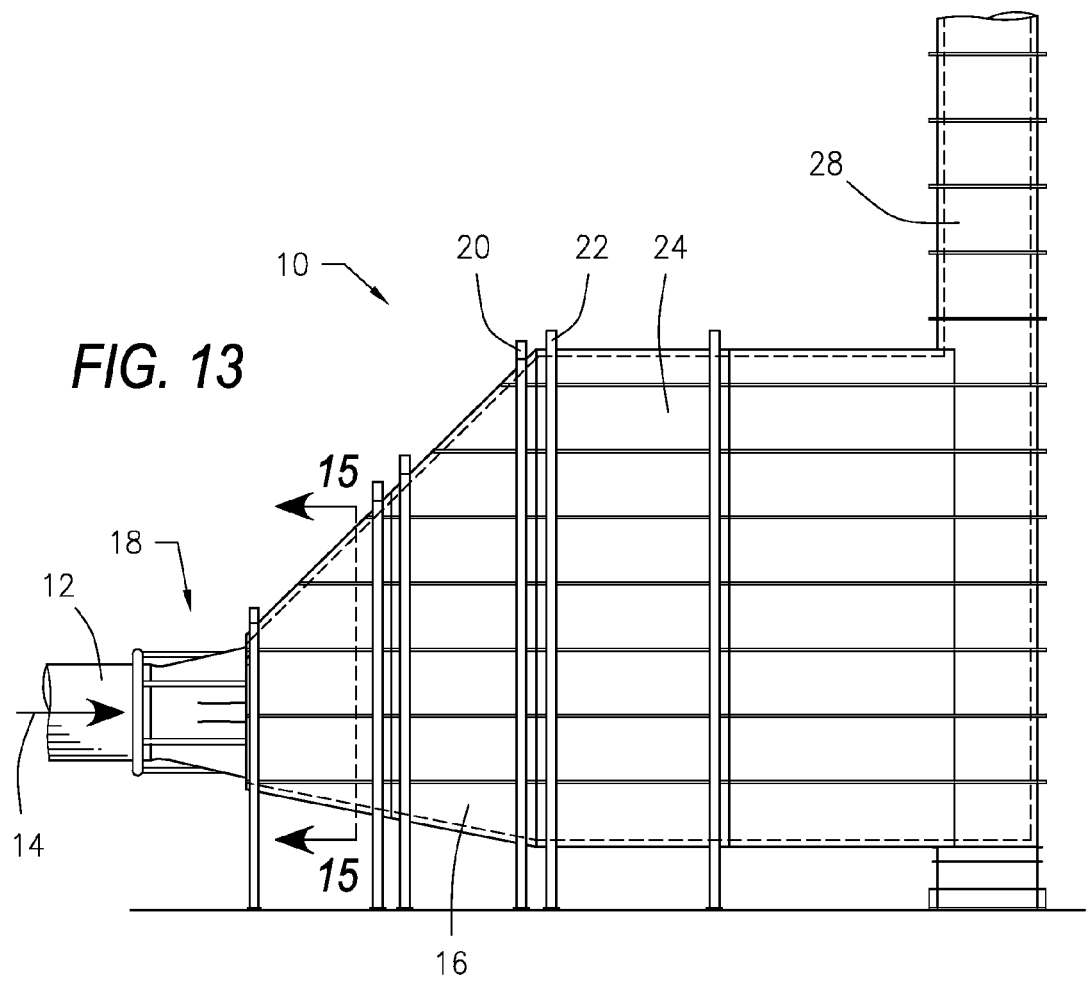
FIG. 13 is a plan view of the SCR system shown in FIG. 12.

Referring to the figures of the drawings, wherein like numerals of reference designate like elements throughout the several views, and initially referring to FIGS. 1 and 2, the SCR system 10 includes a gas input duct 12, wherein a flue gas waste stream (arrow 14) from combustion enters the SCR system 10. Downstream from the gas input duct 12 may be a distribution grid 16. The distribution grid 16 axially distributes the waste stream 14 so as to limit the pressure drop on the successive elements. Downstream from the gas input duct 12 and the distribution grid 16, if it is present, is a catalyst bed 20. The catalyst bed 20 removes carbon monoxide from the waste stream 14.

The combined flow mixing, tempering and noise suppressing apparatus 18 is positioned downstream from the gas input duct 12, and aides in limiting the pressure drop by conditioning the flow of the waste stream 14. The combined flow conditioner and noise suppressing apparatus 18 is positioned upstream of the catalyst bed 20 in the SCR system 10, thereby improving the SCR system's 10 efficiency and reducing sound pollution. The combined flow conditioner and noise suppressing apparatus 18 can be a lobe mixer, as exemplified in the figures.

Downstream from the catalyst bed 20 is at least one ammonia injection grid assembly 22, followed by at least one SCR catalyst assembly 24. The ammonia injection grid assembly 22 and the SCR catalyst assembly 24 work in conjunction to remove $NO_x$ present in the waste stream 14. Downstream from the ammonia injection grid assembly 22 and the SCR catalyst assembly 24 could be additional ammonia injection grid assemblies and/or SCR catalyst assemblies to remove additional $NO_x$ remaining in the waste stream 14.

Downstream from the SCR catalyst assembly 24 is an exhaust stack 28 whereby the treated flue gas waste stream 14 exits the SCR system 10. The combined flow mixing, tempering and noise suppressing apparatus 18 provides noise suppression and eliminates the need for a muffler or silencer in the SCR exhaust stack 28. This allows the SCR system 10 to be used in locations where sound pollution is a concern. Further, by eliminating the need for a muffler in the SCR exhaust stack 28, the SCR exhaust stack 28 requires less space, is less expensive and has less pressure loss for a more effective exhaust system.

The combined flow mixing, tempering and noise suppressing apparatus 18 decreases shear and increases mixing as the waste stream 14 enters the gas input duct 12 of the SCR system 10. (The combined flow mixing, tempering and noise suppressing apparatus 18 partially preconditions the waste stream 14 to a predetermined profile for introduction into the SCR system. The suppressing apparatus rapidly mixes the waste stream 14 with gases already present in the gas input duct 12, or gases introduced using a secondary stream, in order to reduce the density gradient between the waste stream 14 and the SCR gases, which reduces the generation of noise.) Further, the combined flow mixing, tempering and noise suppressing apparatus 18 provides a well-mixed, evenly tempered waste stream 14 in the SCR system 10 so as to prolong the life of the catalysts of the catalyst bed 20.

The combined flow mixing, tempering and noise suppressing apparatus 18 can be constructed of any suitable materials, such as a casting of metal, formed (pressed) sheet metal, or welded sections of plate. In addition, the combined flow mixing, tempering and noise suppressing apparatus 18 may be coated with a refractory material. The combined flow mixing, tempering and noise suppressing apparatus 18 includes at least one lobe portion 32 that extends toward the centerline axis of the gas input duct 12 with at least one alternating lobe portion 34 leading away from the centerline axis. As exemplified throughout the figures, the combined flow mixing, tempering and noise suppressing apparatus 18 is a lobe mixer having six (6) lobes in a sinusoidal profile, but a person having ordinary skill in the art will readily appreciate that other profiles are possible.

As illustrated in FIGS. 1 through 6, the combined flow mixing, tempering and noise suppressing apparatus 18 is positioned downstream of the gas input duct 12, upstream of the catalyst bed 20 and within the distribution grid 16. In this example, the combined flow mixing, tempering and noise suppressing apparatus 18 does not include a secondary stream, but the SCR system 10 may have at least one air intake duct 30 located downstream from both the gas input duct 12 and the combined flow mixing, tempering and noise suppressing apparatus 18 and upstream of the catalyst bed 20. This allows a secondary stream of tempering air, steam or an ammonia-steam mixture to be added to the combustion waste stream 14. Connected to the air intake duct 30 may be a fan (not shown), and the air flow from the fan may be controlled by a damper (not shown), which may be located adjacent the air intake duct 30. The fan allows tempering air to be forcibly added to the combustion waste stream 14, and the damper allows a user to control the amount of air allowed to pass through the air intake duct 30.

Referring now to FIGS. 7 through 11, the combined flow mixing, tempering and noise suppressing apparatus 18 is positioned at the entrance of the SCR system 10, in particular, downstream of the gas input duct 12 and upstream of the distribution grid 16 and the catalyst bed 20. As exemplified in this example, the forwardly disposed terminal ends of the lobe portion 32 and the lobe portion 34 of the combined flow mixing, tempering and noise suppressing apparatus 18 abuts and is attached to a rearwardly disposed face of a circular plate 36. Similar to above, the combined flow mixing, tempering and noise suppressing apparatus 18 in this example does not include a secondary stream, but the SCR system 10 includes the air intake duct 30 located downstream from the combined flow mixing, tempering and noise suppressing apparatus 18, within the distribution grid 16 and upstream of the catalyst bed 20.

Referring now to the two examples of the combined flow mixing, tempering and noise suppressing apparatus 18 illustrated in FIGS. 12 through 16 and in FIGS. 17 through 21, the SCR system 10 includes the combined flow mixing, tempering and noise suppressing apparatus 18 positioned intermediate of the gas input duct 12 and the distribution grid 16. The forwardly disposed terminal ends of the lobe portion 32 and the lobe portion 34 of the combined flow mixing, tempering and noise suppressing apparatus 18 abuts and is attached to the rearwardly disposed face of the plate 36.

Figure 14:
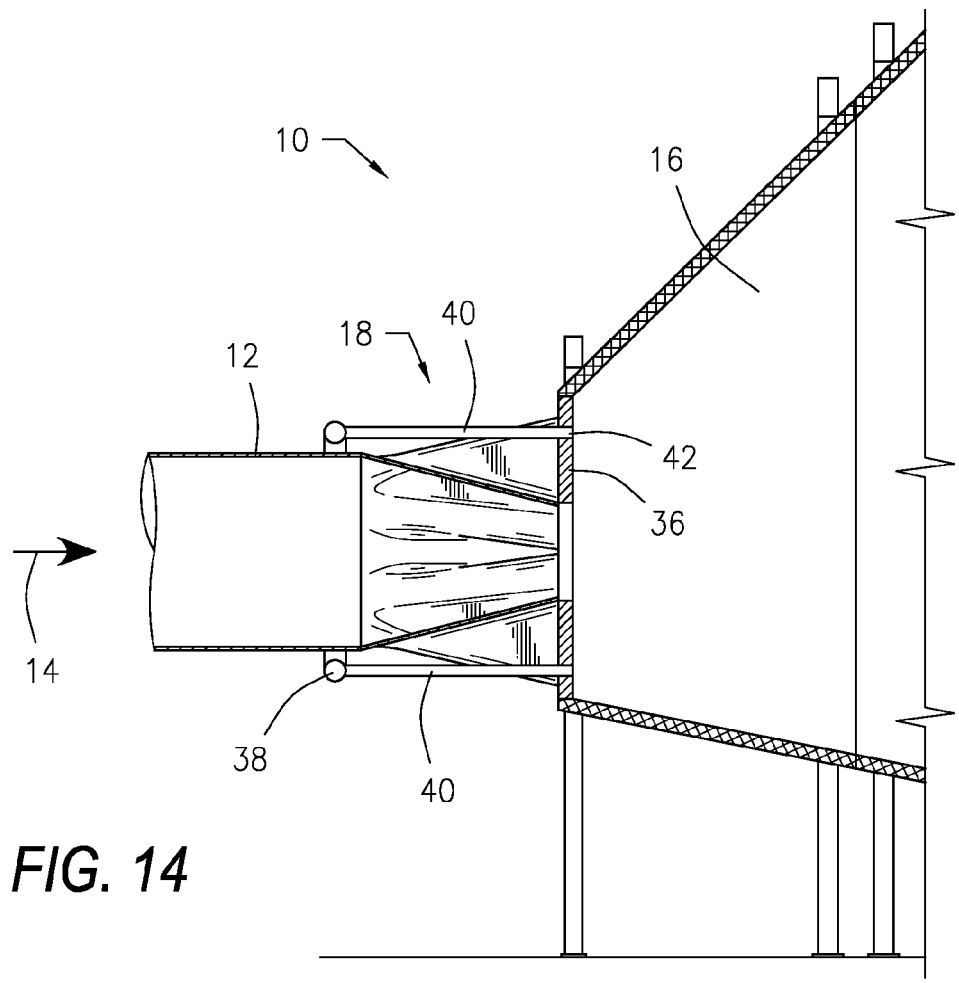
FIG. 14 is a cross-sectional view along line 14-14 of the SCR system shown in FIG. 12.
Figure 15:
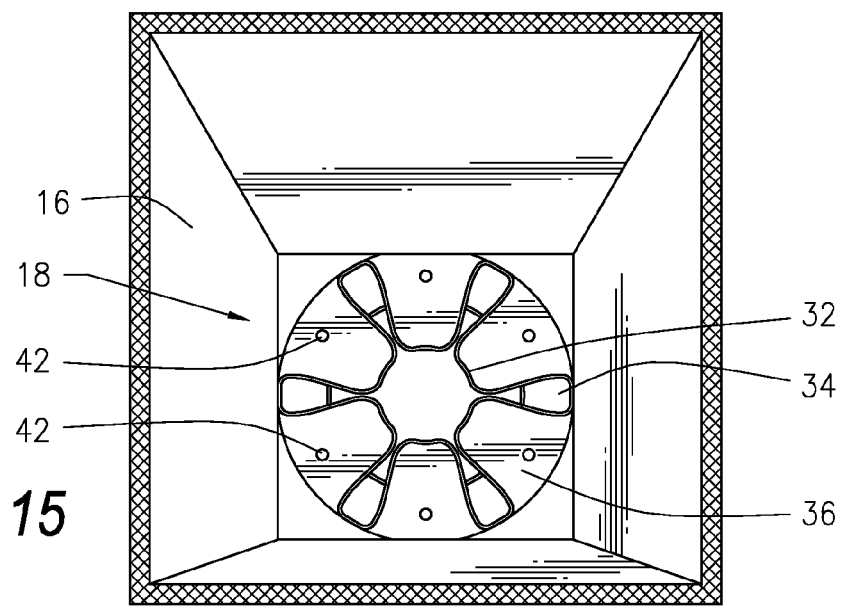
FIG. 15 is a cross-sectional view along line 15-15 of the SCR system shown in FIG. 13.
Figure 16:
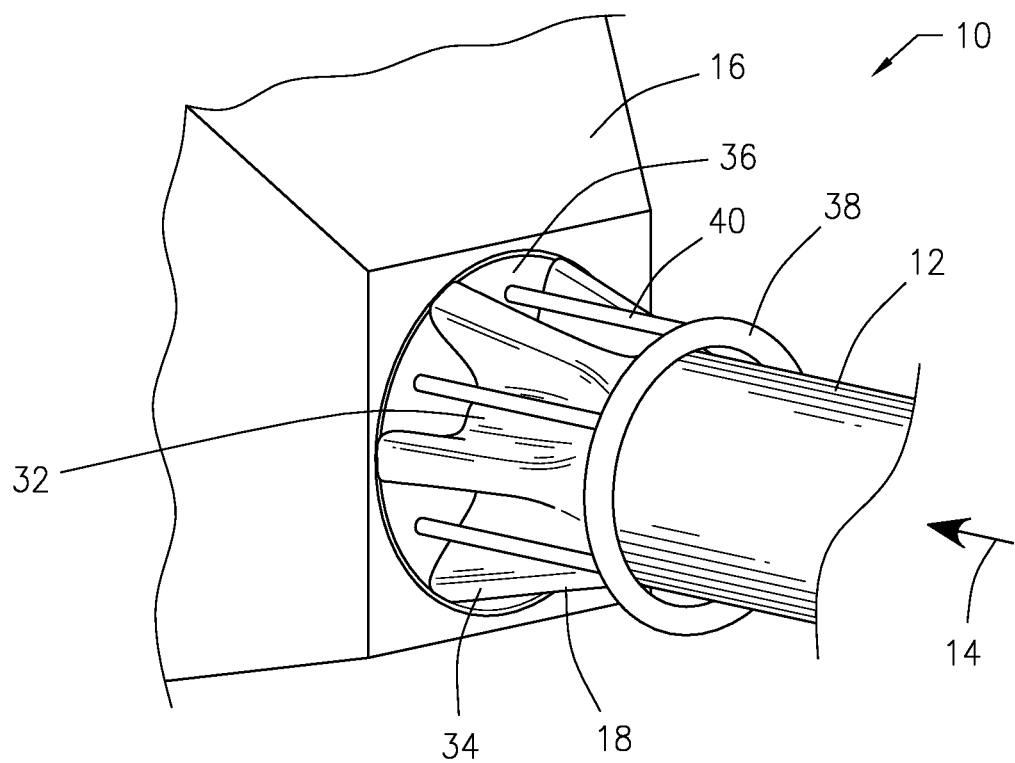
FIG. 16 is a rear perspective view of the external lobe mixer having the straight air manifold shown in FIGS. 12 through 15.
Figure 17:
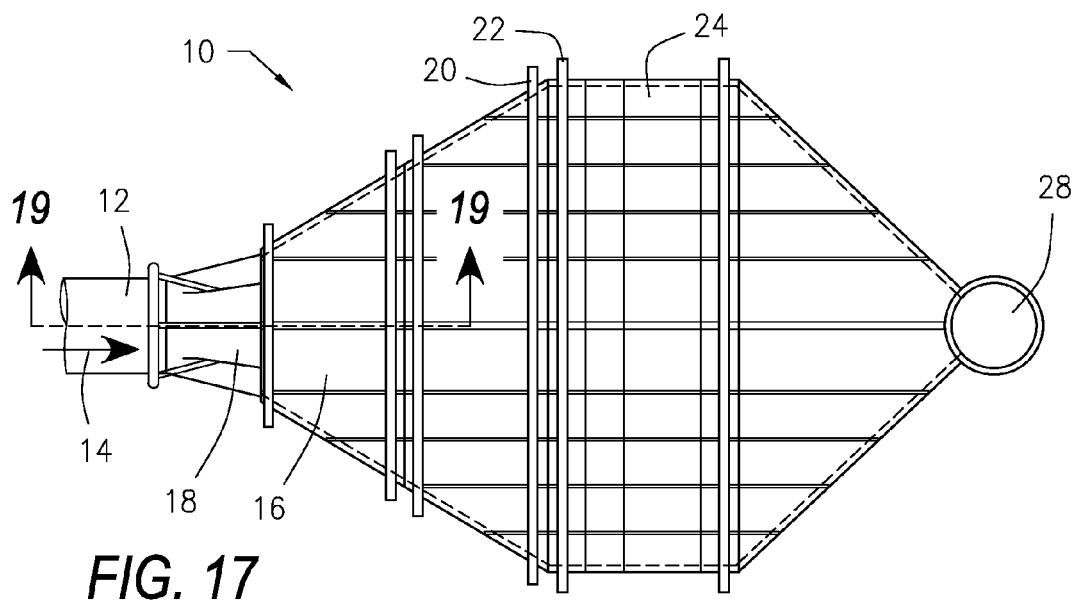
FIG. 17 is an elevation view of an SCR system having an example of an external lobe mixer having an angled air manifold in accordance with an illustrative embodiment of the combined flow mixing, tempering and noise suppressing apparatus for the SCR system disclosed herein.
Figure 18:
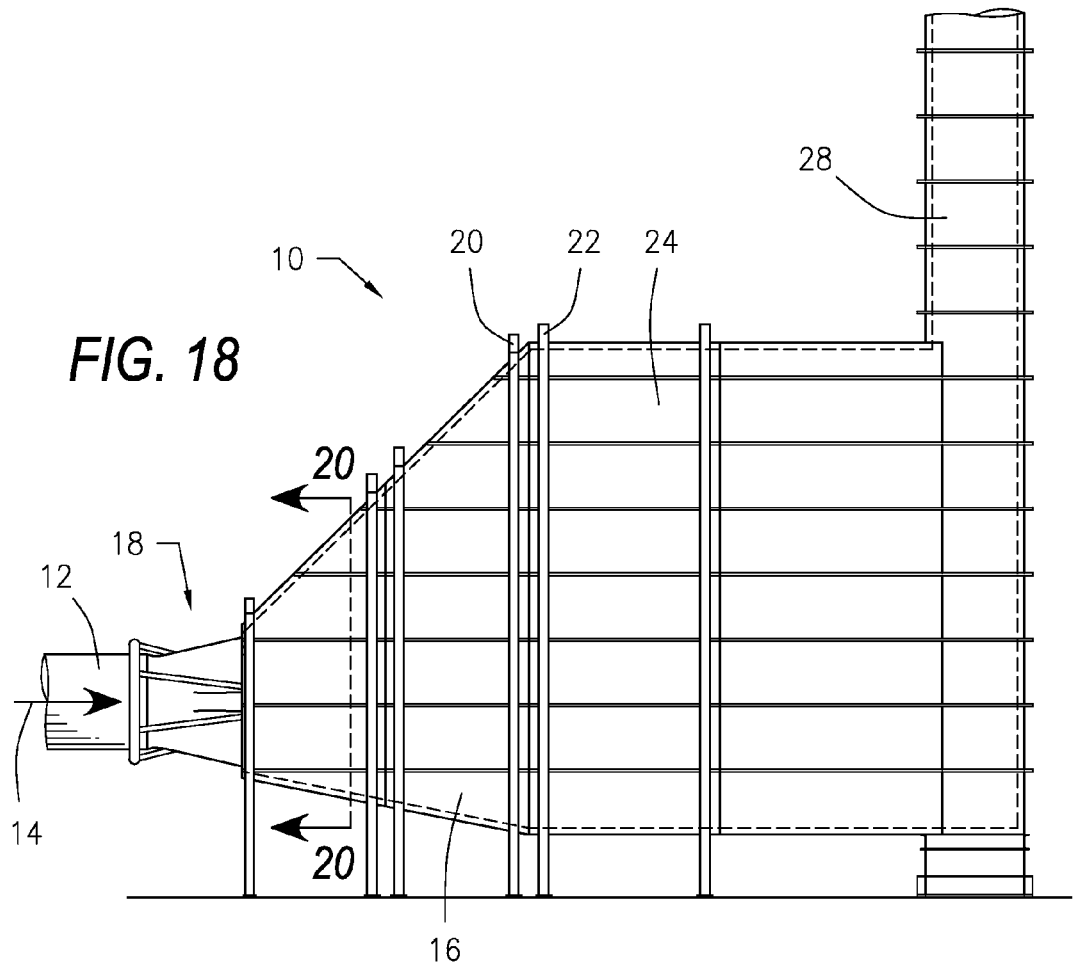
FIG. 18 is a plan view of the SCR system shown in FIG. 17.
Figure 19:
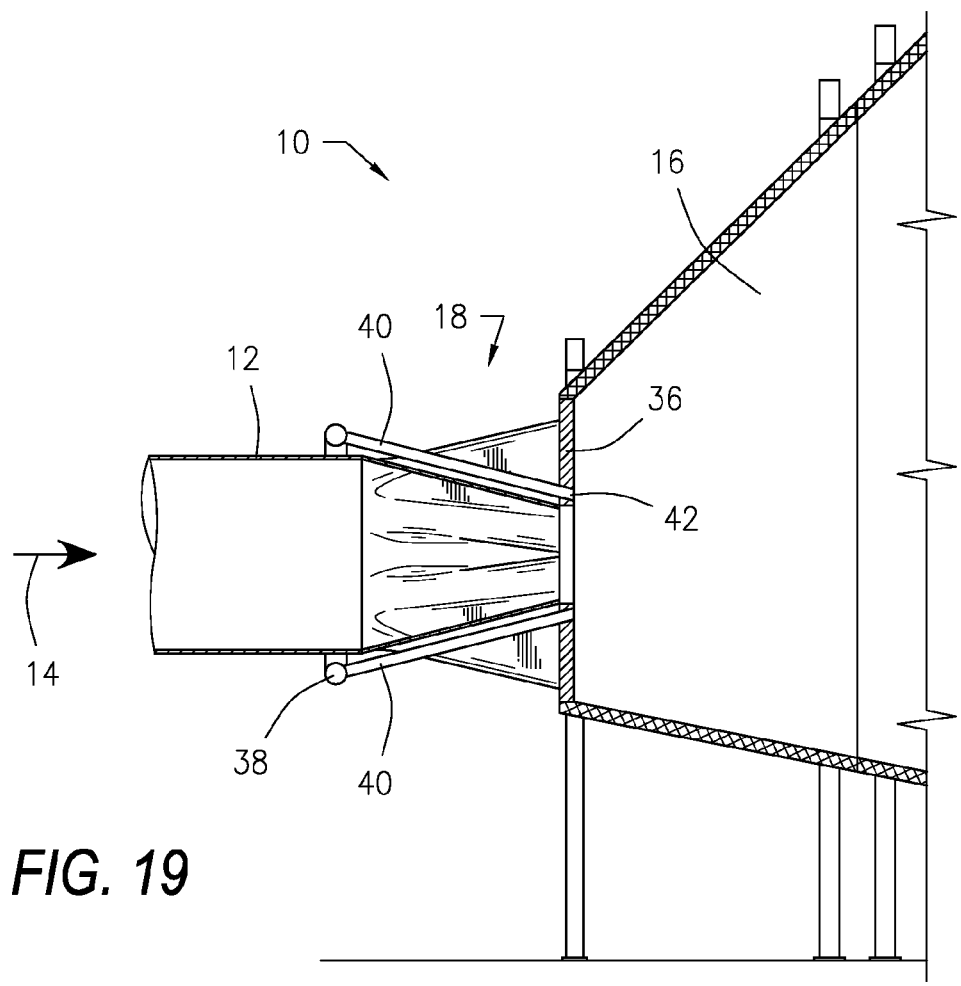
FIG. 19 is a cross-sectional view along line 19-19 of the SCR system shown in FIG. 17.
Figure 20:
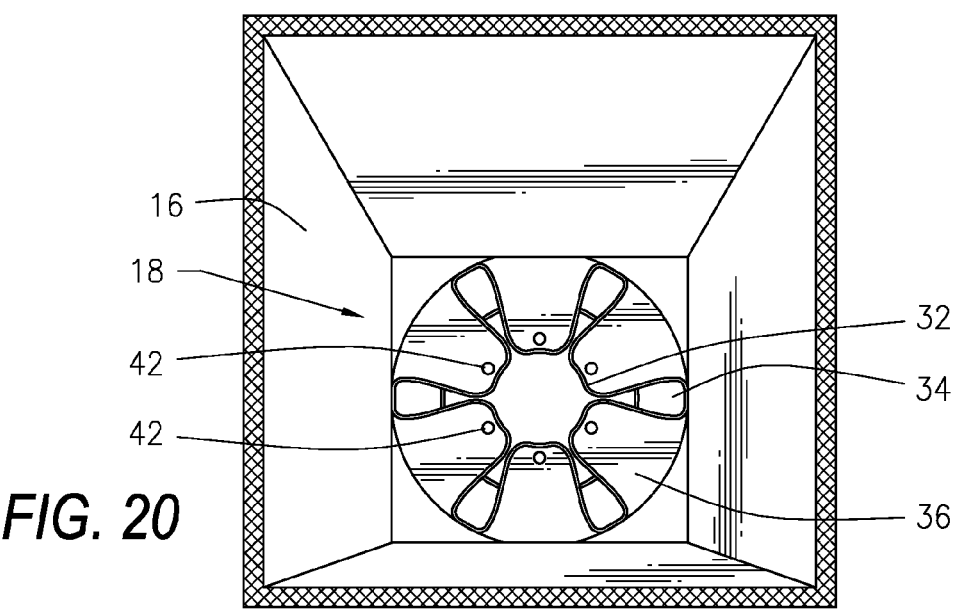
FIG. 20 is a cross-sectional view along line 20-20 of the SCR system shown in FIG. 18.
Figure 21:
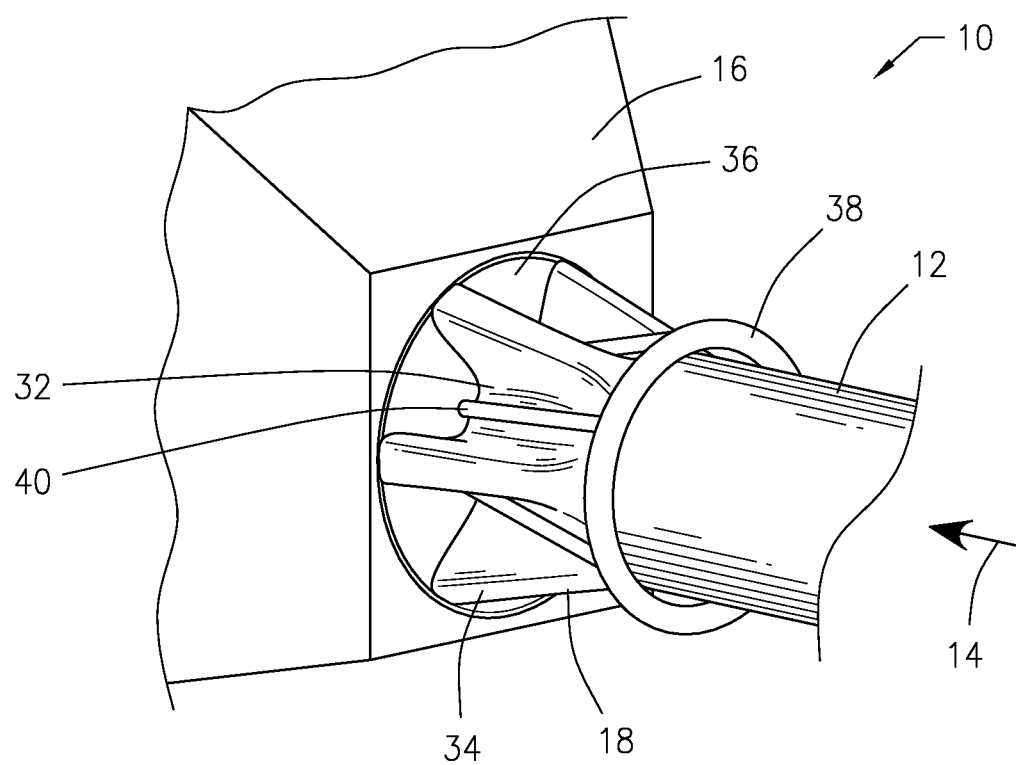
Figure 22:
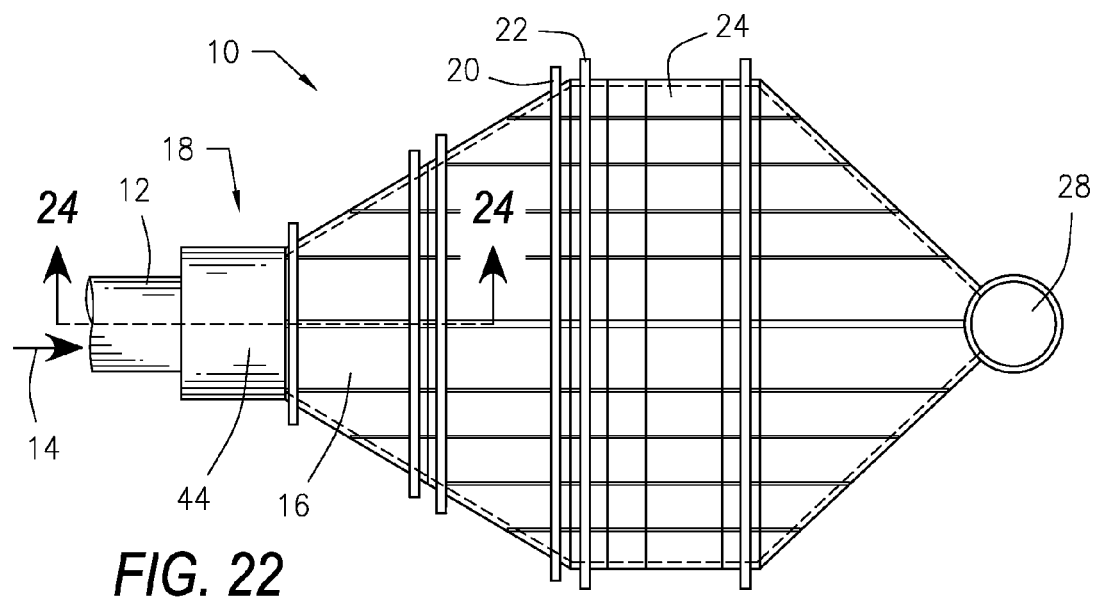
FIG. 22 is an elevation view of an SCR system having an example of an external lobe mixer having an air bustle in accordance with an illustrative embodiment of the combined flow mixing, tempering and noise suppressing apparatus for the SCR system disclosed herein.
Figure 23:
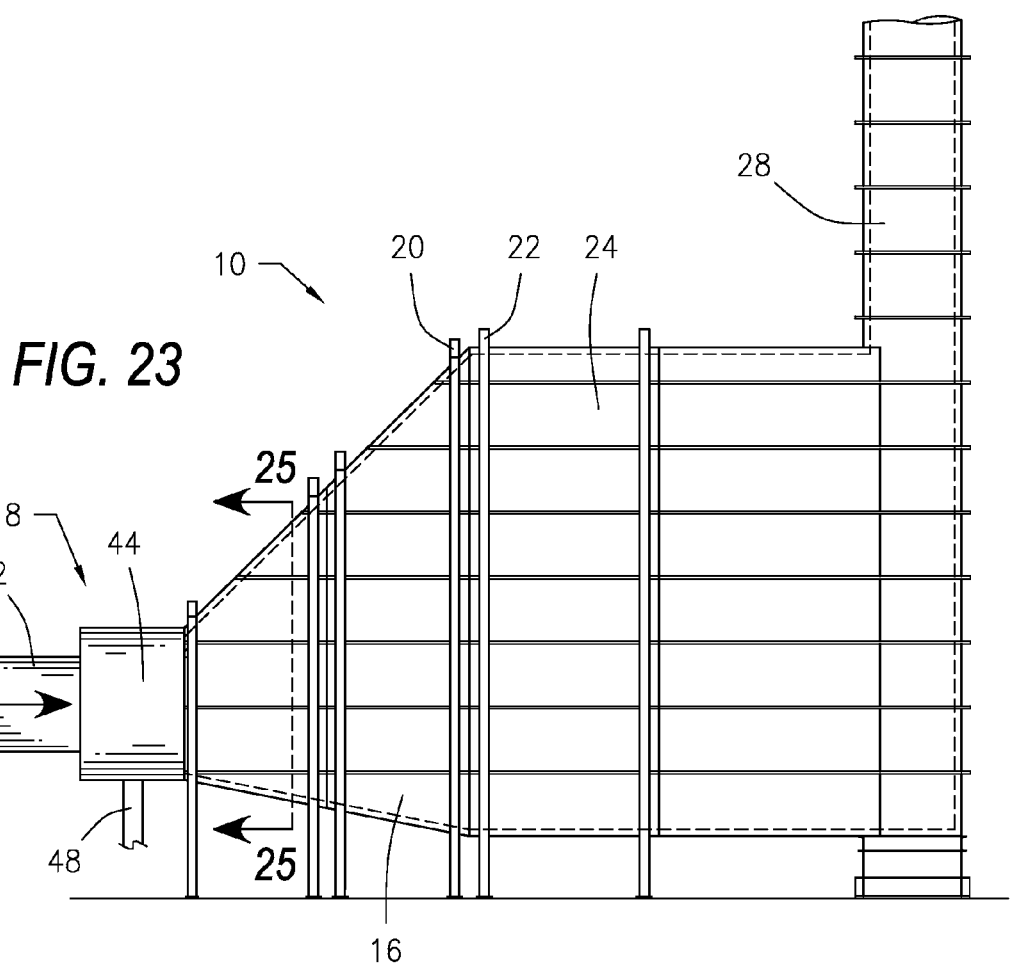
FIG. 23 is a plan view of the SCR system shown in FIG. 22.
Figure 24:
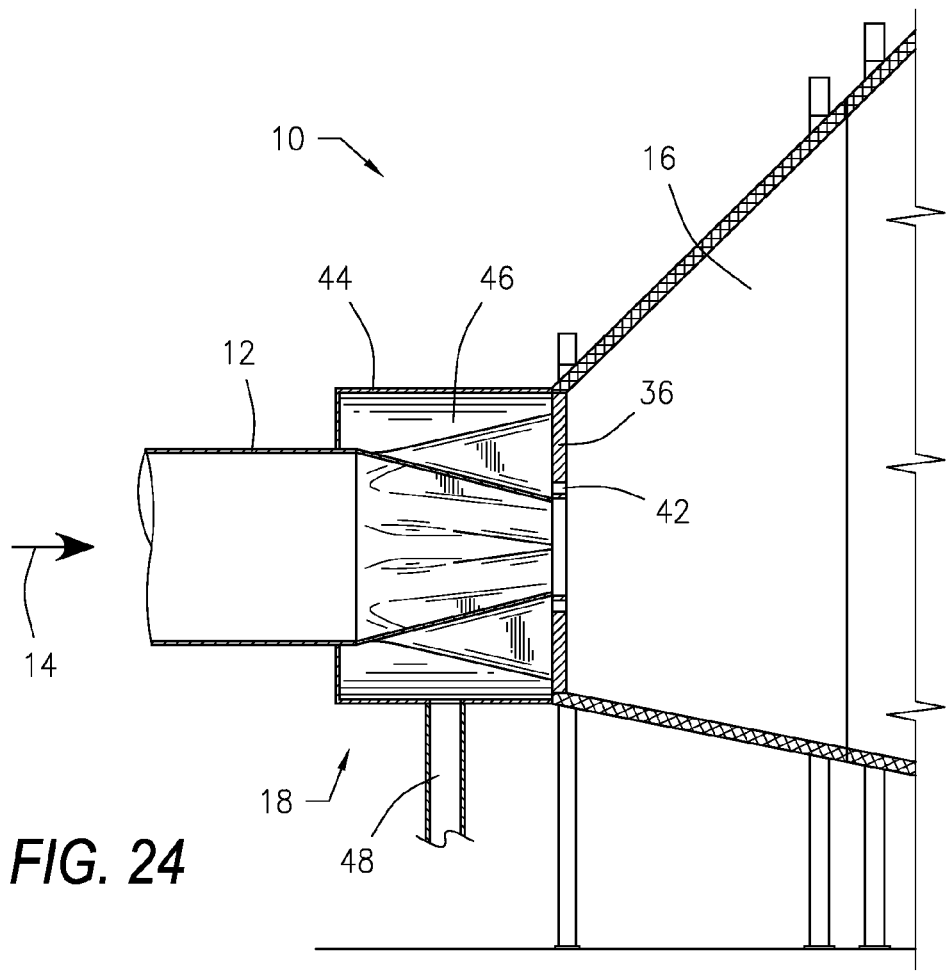
FIG. 24 is a cross-sectional view along line 24-24 of the SCR system shown in FIG. 22.
Figure 25:
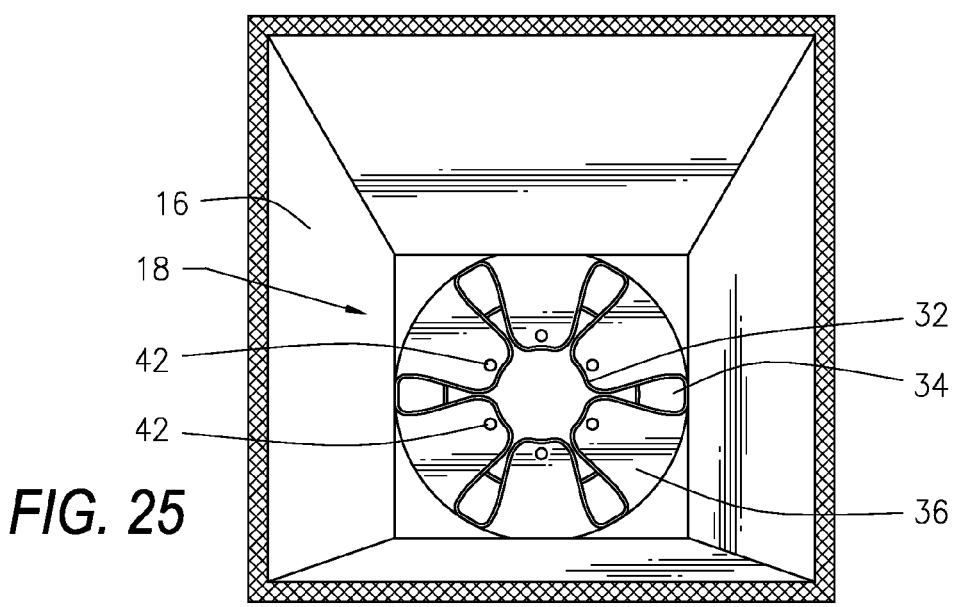
FIG. 25 is a cross-sectional view along line 25-25 of the SCR system shown in FIG. 23.
Figure 26:
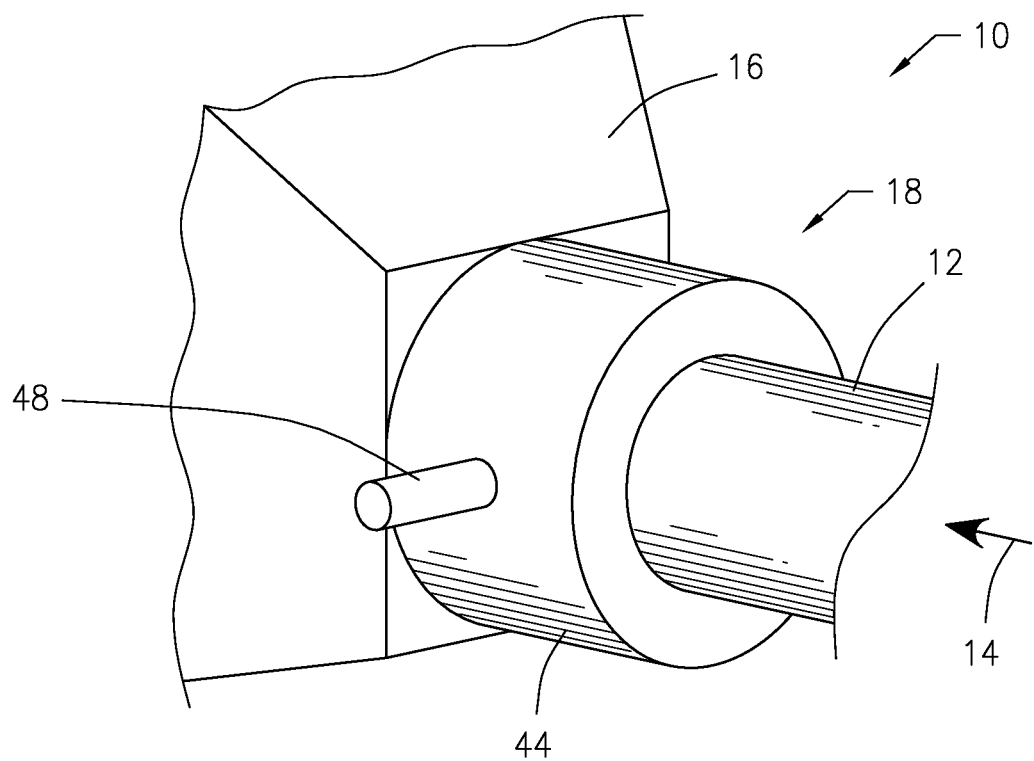
FIG. 26 is a rear perspective view of the external lobe mixer having the air bustle shown in FIGS. 22 through 25.

In these examples, the combined flow mixing, tempering and noise suppressing apparatus 18 includes a means of introducing the secondary stream into the SCR system for mixing with the waste stream 14, such as by means of a toroidal air manifold 38 having a plurality of air manifold pipes 40 circumferentially spaced and in fluid communication with circumferentially spaced ports 42 in the plate 36. As can be seen in FIGS. 14 and 16, the manifold pipes 40 may be positioned substantially parallel with respect to the plane of the flow of the waste stream 14, and are positioned within the lobe portions 32. Alternatively as can be seen in FIGS. 19 and 21, the manifold pipes may be positioned at an angle with respect to the flow of the waste stream 14 so as to cause an angular impingement of the secondary stream with the flow of the waste stream 14. The secondary stream is introduced to the air manifold 38 which blows downstream in the direction of the distribution grid 16. The secondary stream penetrates the ports 42 in the plate 36 where it is added to the waste stream 14, where the suppressing apparatus 18 effectively mixes and conditions the waste stream 14 and the SCR gases to reduce the generation of noise in the SCR system 10.

Turning now to FIGS. 22 through 26, the combined flow mixing, tempering and noise suppressing apparatus 18 may include a hollow annular air bustle 44 forming a chamber 46 to which the secondary stream under pressure is supplied from a pipe 48. In order to admit the secondary stream from the air bustle 44 into the SCR system 10, ports 42 are provided in the plate 36 suitably arranged, such as circumferentially spaced, so as to afford fluid communication between the air bustle 44 and the SCR system 10. A forwardly disposed wall of the air bustle 44 abuts and is attached to the rearwardly disposed face of the circular plate 36. The secondary stream is introduced into the chamber 46 of the air bustle 44 and blows downstream to penetrate the ports 42 in the plate 36. The combined flow mixing, tempering and noise suppressing apparatus 18 mixes the secondary stream with the waste stream 14 to improve the flow uniformity and to reduce the noise at the gas input duct 12 of the SCR system 10 with minimal pressure loss.

Whereas, the apparatuses and methods have been described in relation to the drawings and claims, it should be understood that other and further modifications, apart from those shown or suggested herein, may be made within the scope of this invention.

What is claimed is:

1. A selective catalytic reduction system, comprising:
a waste stream gas input duct;
an exhaust stack located downstream from said gas input duct; and
a combined flow mixing, tempering and noise suppressing apparatus positioned downstream from said waste stream gas input duct and upstream from said exhaust stack wherein said combined flow mixing, tempering and noise suppressing apparatus further comprises a toroidal air manifold having a plurality of air manifold pipes or a hollow annular air bustle forming a chamber to which a secondary stream under pressure is supplied.

2. The selective catalytic reduction system of claim 1 further comprising at least one ammonia injection grid assembly and at least one selective catalytic reduction catalyst assembly, ordered such that each ammonia injection grid assembly is immediately followed by a selective catalytic reduction catalyst assembly.

3. The selective catalytic reduction system of claim 2 further comprising a distribution grid located intermediate of said gas input duct and said ammonia injection grid assembly and said selective catalytic reduction catalyst assembly.

4. The selective catalytic reduction system of claim 2 further comprising at least one air intake duct located downstream of said gas input duct and said combined flow mixing, tempering and noise suppressing apparatus and upstream of said ammonia injection grid assembly and said selective catalytic reduction catalyst assembly.

5. The selective catalytic reduction system of claim 3 further comprising at least one air intake duct located downstream of said gas input duct and said combined flow mixing, tempering and noise suppressing apparatus upstream from said distribution grid.

6. The selective catalytic reduction system of claim 1 further comprising at least one catalyst bed located downstream from said gas input duct.

7. The selective catalytic reduction system of claim 6 further comprising a plurality of catalyst beds, ordered such that each catalyst bed is immediately followed by an ammonia injection grid assembly.

8. The selective catalytic reduction system of claim 1 wherein said combined flow mixing, tempering and noise suppressing apparatus comprises a lobe mixer.

9. The selective catalytic reduction system of claim 1 wherein said combined flow mixing, tempering and noise suppressing apparatus is constructed from a casting of metal, a formed or pressed sheet metal or welded sections of plate.

10. The selective catalytic reduction system of claim 1 wherein said combined flow mixing, tempering and noise suppressing apparatus is coated with a refractory material.

11. The selective catalytic reduction system of claim 1 wherein said combined flow mixing, tempering and noise suppressing apparatus comprises at least one lobe depression that extends toward a centerline axis of said gas input duct and at least one alternating lobe protrusion leading away from said centerline axis.

12. The selective catalytic reduction system of claim 11 wherein said combined flow mixing, tempering and noise suppressing apparatus comprises a lobe mixer having six lobe depressions and six lobe protrusions in a sinusoidal profile.

13. The selective catalytic reduction system of claim 1 wherein said combined flow mixing, tempering and noise suppressing apparatus is positioned internally within said selective catalytic reduction system.

14. The selective catalytic reduction system of claim 1 wherein said combined flow mixing, tempering and noise suppressing apparatus is positioned externally at an entrance to said selective catalytic reduction system.

15. The selective catalytic reduction system of claim 1 wherein said manifold pipes are in fluid communication with said selective catalytic reduction system via circumferentially spaced ports.

16. The selective catalytic reduction system of claim 1 wherein said manifold pipes are positioned substantially parallel with respect to the flow of said waste stream.

17. The selective catalytic reduction system of claim 1 wherein said manifold pipes are positioned at an angle with respect to the flow of said waste stream.

18. The selective catalytic reduction system of claim 1 wherein said chamber of said air bustle is in fluid communication with said selective catalytic reduction system via circumferentially spaced ports.

19. A selective catalytic reduction system comprising a gas input duct, a catalyst bed located downstream from said gas input duct, an ammonia injection grid assembly and a selective catalytic reduction catalyst assembly located downstream from said catalyst bed, and an exhaust stack located downstream from said catalyst bed, said ammonia injection grid assembly and said selective catalytic reduction catalyst assembly, said selective catalytic reduction system further comprising:
    a combined flow mixing, tempering and noise suppressing apparatus located downstream from said gas input duct and upstream from said catalyst bed wherein said combined flow mixing, tempering and noise suppressing apparatus further comprises a toroidal air manifold having a plurality of air manifold pipes or a hollow annular air bustle forming a chamber to which a secondary stream under pressure is supplied.

20. The selective catalytic reduction system of claim 19 wherein said combined flow mixing, tempering and noise suppressing apparatus comprises a lobe mixer.

21. The selective catalytic reduction system of claim 19 wherein said combined flow mixing, tempering and noise suppressing apparatus is constructed from a casting of metal, a formed or pressed sheet metal or welded sections of plate.

22. The selective catalytic reduction system of claim 19 wherein said combined flow mixing, tempering and noise suppressing apparatus is coated with a refractory material.

23. The selective catalytic reduction system of claim 19 wherein said combined flow mixing, tempering and noise suppressing apparatus comprises lobe depressions that extend toward a centerline axis of said gas input duct and alternating lobe protrusions leading away from said centerline axis.

24. The selective catalytic reduction system of claim 23 wherein said combined flow mixing, tempering and noise suppressing apparatus comprises a lobe mixer having six lobe depressions and six lobe protrusions in a sinusoidal profile.

25. The selective catalytic reduction system of claim 19 wherein said combined flow mixing, tempering and noise suppressing apparatus is positioned internally within said selective catalytic reduction system.

26. The selective catalytic reduction system of claim 19 wherein said combined flow mixing, tempering and noise suppressing apparatus is positioned externally at an entrance to said selective catalytic reduction system.

27. The selective catalytic reduction system of claim 19 wherein said manifold pipes are in fluid communication with said selective catalytic reduction system via circumferentially spaced ports.

28. The selective catalytic reduction system of claim 19 wherein said manifold pipes are positioned substantially parallel with respect to the flow of said waste stream.

29. The selective catalytic reduction system of claim 19 wherein said manifold pipes are positioned at an angle with respect to the flow of said waste stream.

30. The selective catalytic reduction system of claim 19 wherein said chamber of said air bustle is in fluid communication with said selective catalytic reduction system via circumferentially spaced ports.

31. The selective catalytic reduction system of claim 19 further comprising a plurality of ammonia injection grid assemblies and a plurality of selective catalytic reduction catalyst assemblies, ordered such that each ammonia injection grid assembly is immediately followed by a selective catalytic reduction catalyst assembly.

32. The selective catalytic reduction system of claim 19 further comprising a distribution grid located intermediate of said gas input duct and said ammonia injection grid assembly and said selective catalytic reduction catalyst assembly.

33. The selective catalytic reduction system of claim 19 further comprising at least one air intake duct located intermediate of said gas input duct and said ammonia injection grid assembly and said selective catalytic reduction catalyst assembly.

34. The selective catalytic reduction system of claim 33 further comprising at least one air intake duct located upstream from said distribution grid.

35. The selective catalytic reduction system of claim 19 further comprising a plurality of catalyst beds, ordered such that each catalyst bed is immediately followed by an ammonia injection grid assembly.

36. A combined flow mixing, tempering and noise suppressing apparatus for a selective catalytic reduction system, wherein said selective catalytic reduction system comprises a gas input duct, a catalyst bed located downstream from said gas input duct, an ammonia injection grid assembly and a selective catalytic reduction catalyst assembly located downstream from said catalyst bed, and an exhaust stack located downstream from said ammonia injection grid assembly and said selective catalytic reduction catalyst assembly, said combined flow mixing, tempering and noise suppressing apparatus comprising:
    a lobe mixer positioned downstream from said gas input duct and upstream from said catalyst bed in said selective catalytic reduction system, and said lobe mixer comprises lobe depressions that extend toward a centerline axis of said gas input duct and alternating lobe protrusions leading away from said centerline axis wherein said combined flow mixing, tempering and noise suppressing apparatus further comprises a toroidal air manifold having a plurality of air manifold pipes or a hollow annular air bustle forming a chamber to which a secondary stream under pressure is supplied.

37. The combined flow mixing, tempering and noise suppressing apparatus of claim 36 wherein said lobe mixer is constructed from a casting of metal, a formed or pressed sheet metal or welded sections of plate.

38. The combined flow mixing, tempering and noise suppressing apparatus of claim 36 wherein said lobe mixer is coated with a refractory material.

39. The combined flow mixing, tempering and noise suppressing apparatus of claim 36 wherein said lobe mixer comprises six lobe depressions and six lobe protrusions in a sinusoidal profile.

40. The combined flow mixing, tempering and noise suppressing apparatus of claim 36 wherein said manifold pipes are in fluid communication with said selective catalytic reduction system.

41. The combined flow mixing, tempering and noise suppressing apparatus of claim 36 wherein said manifold pipes are positioned substantially parallel with respect to the flow of said waste stream.

42. The combined flow mixing, tempering and noise suppressing apparatus of claim 36 wherein said manifold pipes are positioned at an angle with respect to the flow of said waste stream.

43. The combined flow mixing, tempering and noise suppressing apparatus of claim 36 wherein said chamber of said air bustle is in fluid communication with said selective catalytic reduction system.

* * * * *